United States Patent [19]
Terayama et al.

[11] Patent Number: 5,825,749
[45] Date of Patent: Oct. 20, 1998

[54] MULTIPLEX DATA COMMUNICATION SYSTEM

[75] Inventors: Koji Terayama; Seiji Hirano, both of Hiroshiima; Toshiaki Kawanishi, Akishima; Toshifumi Ikeda, Hiroshima; Hiroaki Sakamoto, Aki-gun, all of Japan

[73] Assignee: Mazda Motor Corporation, Hiroshima, Japan

[21] Appl. No.: 625,316

[22] Filed: Apr. 1, 1996

[30] Foreign Application Priority Data

| Mar. 31, 1995 | [JP] | Japan | 7-074303 |
| Mar. 31, 1995 | [JP] | Japan | 7-074304 |

[51] Int. Cl.⁶ .................................................. H04J 3/02
[52] U.S. Cl. ........................ 370/244; 370/447; 370/462
[58] Field of Search ................................. 370/241, 244, 370/250, 422, 423, 425, 426, 445, 446, 447, 461, 462, 522; 307/10.1; 340/825.06, 825.08, 825.5, 825.51; 371/32, 33, 47.1; 375/219, 220

[56] References Cited

U.S. PATENT DOCUMENTS

| 4,745,596 | 5/1988 | Sato | 370/447 |
| 4,807,231 | 2/1989 | Sato | 371/47.1 |
| 4,914,654 | 4/1990 | Matsuda et al. | 370/522 |
| 4,942,571 | 7/1990 | Moller et al. | 370/425 |
| 5,142,526 | 8/1992 | Moriue et al. | 370/445 |
| 5,251,211 | 10/1993 | Mutoh et al. | 370/445 |
| 5,272,699 | 12/1993 | Nobutoki et al. | 370/216 |
| 5,274,638 | 12/1993 | Michihira et al. | 370/448 |
| 5,357,525 | 10/1994 | Moriue et al. | 370/451 |

*Primary Examiner*—Alpus H. Hsu

[57] ABSTRACT

A multiplex data communication system including a number of communication nodes interconnected through a transmission path, each of which includes a data transmitting/receiving circuit providing a reception signal representative of normal data reception from another communication node and a transmission signal representative of normal data transmission therefrom, and a data operation circuit for controlling an electronic equipment unit associated with each communication node based on the data from the other communication node and generating the data relating to each communication node which is transmitted by the data transmitting/receiving circuit, the data operation circuit making a judgement of normality of a data communication function of each communication node based on at least one of the data reception signal and data transmission signal.

16 Claims, 8 Drawing Sheets

FIG. 9

| FRAME ID | FRAME ID INFORMATION |
|---|---|
| DATA-1 | TRANSMITTING NODE ADDRESS |
| DATA-2 | REVERSED INFORMATION OF DATA-1 |
| DATA-3 | PRE-AGREED INFORMATION |
| DATA-4 | REVERSED INFORMATION OF DATA-3 |

MULTIPLEX DATA COMMUNICATION SYSTEM

BACKGROUND OF THE INVENTION

1. Field of the Invention

The present invention relates to a data communication system, and, more particularly, to a multiplex data communication system including a number of communication nodes interconnected through a common multiplex communication line in which the communication nodes mutually proof normality in the communication function of one another.

2. Description of the Related Art

In recent years, in order to eliminate swollen and complicated wiring harnesses accompanying an increase in the number of electronic equipment units employed in automotive vehicles, communication nodes for the electronic equipment units are interconnected through a common multiplex transmission line so as to transmit data and signals between the electronic equipment units. In multiplex data communication systems in which a plurality of communication nodes are interconnected to transmit or receive digital information or to transmit and receive digital information, the utilization is made of a certain length of data frame in order to provide easy communication of digital information from each communication node to at least another communication node. This data frame, which is otherwise called a communication frame, consists of a group of code data in conformity with a data form in which the total data length is predetermined by a specified number of bits.

For the purpose of providing a brief description of one of communication frame formats available in multiplex data communication systems which have been widely employed in automotive vehicles, reference is made to FIG. 1.

FIG. 1 illustrates, by means of example, one of communication frame formats employed in conventional multiplex communication systems installed in, in particular, automotive vehicles. A communication frame F includes a number of successive fields for various data codes, such as a start delimiter (SD) code, a priority (PR) code, a frame identification (ID) code and a data length (DL) code which are positioned in order before a series of data fields, such as a data-1 field to a data-N field, and a check (CH) code after the series of data fields.

The start delimiter (SD) code indicates the leading end of the communication frame F which in turn is received by a communication node for recognition of reception of the communication frame F. The priority (PR) code indicates the order of priority transmission of data coincidentally provided from multiple communication nodes upon a collision of the coincident data. In this instance, higher priority is given to data having a lower value of bits. If multiple communication nodes simultaneously transmit data signals, a priority code provided by a communication node that has a higher priority is left over on the bus and, as a result, a priority code provided by another communication node that has a lower priority is differed. On the basis of this event a collision of the data is detected. The communication node having a lower priority delays another transmission of the unsuccessful communication frame F, giving priority to another transmission of the communication frame F from the communication node having a higher priority.

The frame identification (ID) code indicates a communication node to which the communication frame F is directed or addressed. If the system has multiple communication nodes, the field allocates one area for a frame identification code of each communication node. A data transmitting node (the term "data transmitting node" as used herein shall mean and refer to a communication node that transmits data or a data frame) transmits an identification (ID) code to a specified data receiving node (the term "data receiving node" as used herein shall mean and refer to a communication node that is designated to receive the data or data frame). Each communication node, which has a memory map of identification (ID) codes for acceptable communication frames, receives only a communication frame F with a frame identification (ID) code consistent with any one of the identification (ID) codes in the memory map.

Data length (DL) code indicates the length of following data, or the number of following data as information for the data receiving node. The check (CH) code indicates the trailing end of the communication frame F. In the acknowledgement (ACK) field receives acknowledgement (ACK) signals provided by data receiving nodes. This acknowledgement (ACK) signal is contained in a communication frame from each communication node as a data receiving node and transmitted to the data transmitting node only when the communication frame F provided by the data transmitting node is properly received by the data receiving node. Accordingly, if the data transmitting node does not receive the communication frame containing the acknowledgement (ACK) signal from a data receiving node, it determines that the transmission of communication frame to the data receiving node was unsuccessful and then, effects another transmission of the same communication frame to the data receiving node.

Architecture of a typical communication node of the conventional multiplex communication system generally installed in automotive vehicles is shown in FIG. 2. The communication node includes a large scale integrated (LSI) circuit 101 for communication through which the communication node is connected to the transmission line 103 and a central processing unit (CPU) 100 for various control according to programs stored in a random access memory (RAM) and a read only memory (ROM) 102. The protocol control in the system of carrier sense multiple access with collision detection (CSMA/CD) network at a physical signaling layer is performed by the large scale integrated (LSI) circuit 101. This communication node is connected to an associated electronic equipment unit 104, such as an engine control unit and nodes of various meters, through the central processing unit (CPU) 100.

The central processing unit (CPU) 100 controls the large scale integrated (LSI) circuit 101 and processes data from the large scale integrated (LSI) circuit 101 and transmits data between the electronic equipment unit 104 and the large scale integrated (LSI) circuit 101. Specifically describing, the central processing unit (CPU) 100 transforms data of a communication frame on the bus line into formatted data available for the electronic equipment unit 104 and also formats data from the electronic equipment unit 104 in conformity with a specified communication frame. The central processing unit (CPU) 100 has a function of managing acknowledgement signals which is one of the important functions thereof. As was previously described, in the multiplex data communication system, each data receiving node, in particular the communication LSI circuit 101 thereof, sends an acknowledgement signal to a data transmitting node when having properly received a communication frame from the data transmitting node. Consequently, the central processing unit (CPU) 100 of each data transmitting node can uncover which data receiving node has failed in receiving the communication frame by searching the acknowledgement field of communication frame from the data receiving node. This is because, while the communication LSI circuit 101 is limited in operation to communication control, the central processing unit (CPU) 100 assumes high speed data processing.

There has been known from Japanese Unexamined Patent Publication No. 3-283842 one of such multiplex data communication systems consisting of communication nodes of the type described above in which each communication node observes normality in a data reception function of respective data receiving nodes on the basis of an acknowledgement signal in the communication frame transmitted to the data transmitting node from the data receiving node.

There has further been known from Japanese Unexamined Patent Publication No. 5-138211 another multiplex data transmission system consisting of communication nodes of the type described above in which each communication node provides a check signal indicating normality of its own communication function every specified interval with which another communication node determines abnormality of the data transmission function of the data transmitting node when the data receiving node does not receive the check signal.

While these multiplex data communication systems taught by the publications described above can uncover abnormality in a data reception function of any one of data receiving nodes on the basis of an acknowledgement signal in the communication frame sent back, because each data transmitting node is allowed to transmit a communication frame not containing an acknowledgement signal, it can not observe normality in its own data transmission function.

In the conventional multiplex data communication systems, while the check code (CH) proves only the trailing end of a communication frame, nevertheless, if a communication frame is incorrectly generated, the check code does not provide any basis for functional normality of the data transmitting node. Further, in the multiplex data communication system taught by the Japanese Unexamined Patent Publication No. 5-138211, while each communication node can observe a check signal indicating functional normality of another data transmitting node, it is impossible to make mutual observation of normality in data transmission and reception functions of communication nodes and to prove the truth of a communication frame received by each communication node.

SUMMARY OF THE INVENTION

It is an object of the present invention to provide a multiplex data communication system in which each data receiving node proves normality in data reception function of a data transmitting node on the basis of an acknowledgement signal contained in a communication frame received thereby.

It is another object of the present invention to provide a multiplex data communication system in which a data transmitting node and a data receiving node mutually prove normality in their data reception function on the basis of acknowledgement signals contained in communication frames.

It is still another object of the present invention to provide a multiplex data communication system in which a data receiving node correctly proves normality in data transmission function of a data transmitting node.

The aforesaid objects of this invention are achieved by providing a multiplex data communication system including a plurality of communication nodes, which are interconnected by means of a transmission path, for controlling electronic equipment units connected thereto, respectively. Each communication node comprises a data transmitting/receiving circuit, which transmits data or a communication frame relating to attributes of the communication node through the transmission path and receives data or communication frame transmitted from at least another one of the communication nodes through the transmission path, for providing a reception signal representative of normal reception of the data from the other communication node and a transmission signal representative of normal data transmission of the communication node, and a data operation circuit, which controls operation of an electronic equipment unit associated with the communication node based on the data from the other communication node and generates the data relating to the communication node for transmission through the data transmitting/receiving circuit, for proving normality in data communication function of the communication node based on at least one of the reception signal and transmission signal.

According to another aspect of the invention, the multiplex data communication system comprises a data transmitting means for transmitting a proof data frame with which another communication node proves normality in data transmission function of the communication node before transmission of a communication frame of data attributive to the communication node and a data receiving means, for receiving the proof data frame and the communication frame from another communication node, which observes specific data contained in the proof data frame so as to prove normality in transmission function of the other communication node and assumes abnormality of the other communication node when the data in the specified field of the proof data frame is unacceptable.

The proof data frame is transmitted before said multiplex data communication system is brought into operation, in other words, every time the multiplex data communication system is powered on or reset. The proof data frame contains data consisting of specific data pertinent to each another communication node, such as address data and agreed data, and modified or reversed data of the specific data.

With the multiplex data communication system of this invention, normality in data transmission function of each communication node is observed with an improved reliability. Even when any one of the communication nodes encounters functional abnormality, the communication node automatically tries transmission of the unsuccessful communication frame if the functional abnormality is eliminated as a result of resetting the transmitting/receiving circuit.

The period of time for judging abnormality in communication function on the basis of detection of a transmission signal may be changed by communication nodes with the effect of improving the reliability of the system without any decrease in performance of the communication nodes. Furthermore, the transmission of data to and reception of data from each communication node is interrupted when the judgement of abnormality in communication function of the communication node is continually repeated a specified number of times, and risks that the associated electronic equipment unit experiences faulty operation are significantly decreased.

BRIEF DESCRIPTION OF THE DRAWINGS

The above and other objects and features of the present invention will be clearly understood from the following description with respect to a preferred embodiment thereof when considered in conjunction with the accompanying drawings, in which:

FIG. 9 is an illustration showing a proof data frame.

DETAILED DESCRIPTION OF THE EMBODIMENTS

Figure 3:
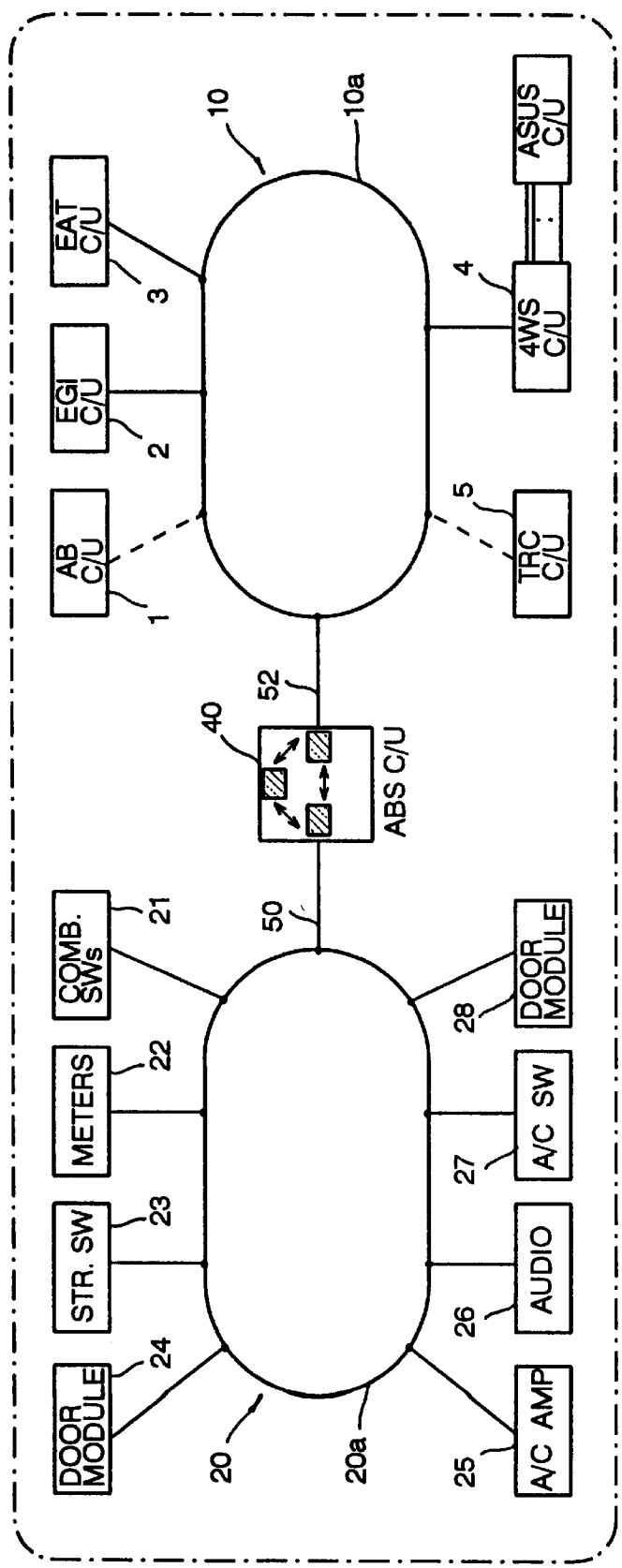
FIG. 3 is a schematic illustration of a multiplex data communication system according to an embodiment of this invention.

Referring to FIG. 3 which schematically illustrates a multiplex communication system as installed in an automobile by way of example, the system includes two communication networks, namely a control system network 10 and an equipment network 20, interconnected by communication lines 10a and 20a, such as twisted-pair transmission lines, respectively. The transmission speed is 20 kbps. The control system network 10 includes communication nodes 1–5 interconnected by the communication line 10a. The equipment system network 20 includes communication nodes 21–28 interconnected by the communication line 20a. These communication lines 10a and 20a are interconnected as an integrated network by a gate-way node 40 through transmission lines 52 and 50.

The gate-way node 40 functions such that the networks 10 and 20 do not allow more than two communication frames to coincidentally exist therein and that each network 10, 20 always allows only one communication frame to exist therein. In other words, the gate-way node 40 has a frame exchange function that, if necessary, allows communication frames to be coincidentally transmitted to the networks 10 and 20, respectively.

Figure 1:
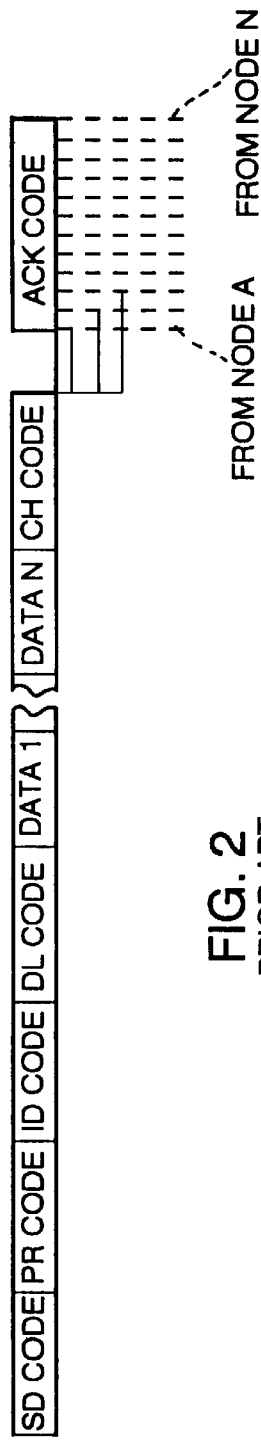
FIG. 1 is an illustration showing a communication frame used in data communication.
Figure 2:
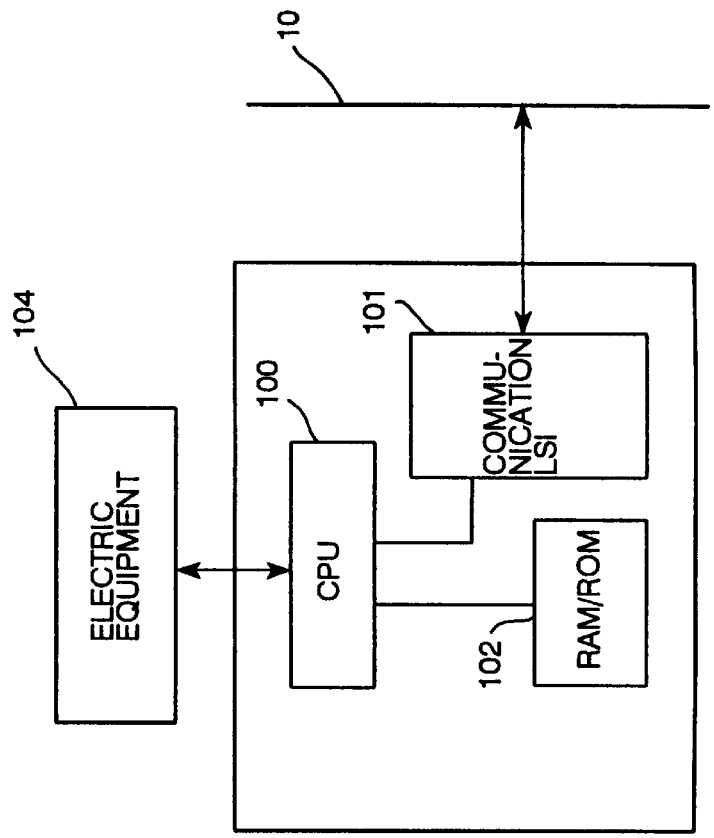
FIG. 2 is a block diagram of an architecture of a communication node of a multiplex data communication system.

The control system network 10 includes a communication node 1 for air-bag control unit (AB C/U), a communication node 2 for an engine control unit (EGI C/U), a communication node 3 for an automatic transmission control unit (EAT C/U), a communication node 4 for a rear wheel steering control unit (4WS C/U), and a communication node 5 for a traction control unit (TRC C/U). The gate-way node 40 is included as one of the communication nodes of the control system network and functions commonly to an anti-lock braking system control unit (ABS C/U). The equipment system network 20 includes a communication node 21 for a combination switch (COMB. SWs), a communication node 22 for various metering instruments (METERS), a communication node 23 for a steering switch (STR. SW), a communication node 24 for switches at a front passenger seat (DOOR MODULE), a communication node 25 for a power amplifier of an air conditioning system (A/C AMP), a communication node 26 for switches of an audio-instrument (AUDIO), a communication node 27 for switches of the air conditioning system (A/C SW), and a communication node 28 for switches at a driver seat (DOOR MODULE). These nodes 21–28 are switches, sensors and actuators associated with electronic equipments. Consolidation of various control units into the single control system network 10 offers efficient harmonized control. Separating the equipment system network 20 from the control system network 10 prevents itself from being affected by excursion of the nodes of the control system network 10. The automobile communication system thus organized transmits driving information by modular communication frames F such as illustrated in FIG. 1.

Figure 4:
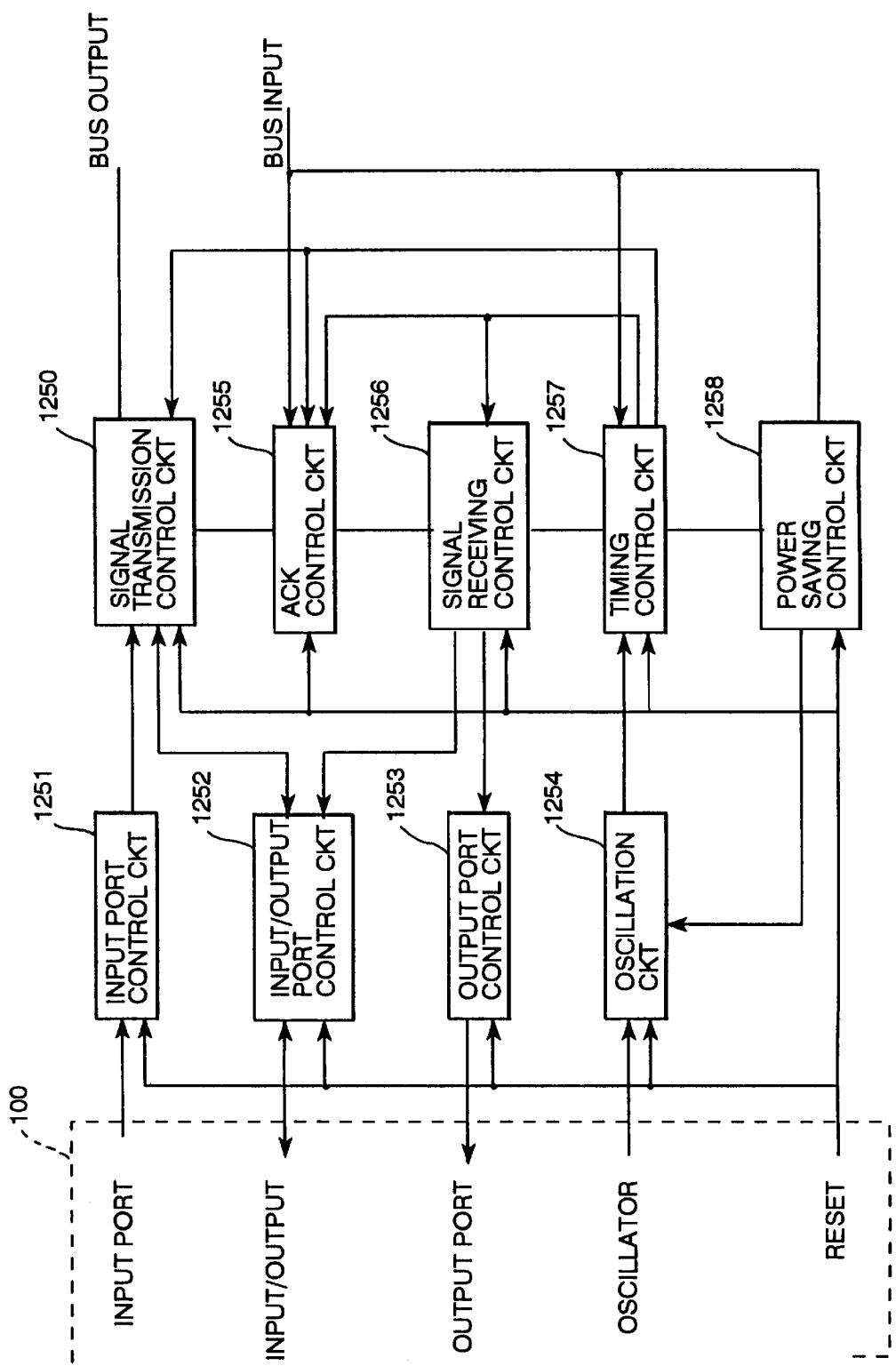
FIG. 4 is a block diagram showing details of an architecture of the communication node of the multiplex data communication system shown in FIG. 3.

FIG. 4 shows the internal architecture of a large-scale integrated (LSI) circuit for use in the multiplex communication system shown in FIG. 3. The large-scale integrated (LSI) circuit comprises various circuits including a transmission control circuit 1250, a receiving control circuit 1256, an acknowledgement (ACK) control circuit 1255. Each of the transmission control circuit 1250 and receiving control circuit 1256 carries out protocol control for the carrier sense multiple access with collision detection (CSMA/CD) network. The transmission control circuit 1250 transmits a transmission conclusion signal to the central processing unit (CPU) 100 through an input/output control circuit 1252 when the transmission of a communication frame is completed. The acknowledgement circuit 1255 transmits an acknowledgement signal following the reception of a correct communication frame by the receiving control circuit 1256. When the central processing unit (CPU) 100 receives a transmission conclusion signal at specified time intervals, it judges its own node to be normal in data transmission function. Further, if the acknowledgement circuit 1255 does not transmit an acknowledgement (ACK) signal to another data receiving node, the central processing unit (CPU) 100 judges its own node to be abnormal in data reception function. On the other hand, if the central processing unit (CPU) 100 does not receive a transmission conclusion signal from another data receiving node, it judges the other data receiving node to be abnormal in data reception function.

The large-scale integrated (LSI) circuit also includes an input port control circuit 1251 to receive input data from the input port of the central processing unit (CPU) 100, an output port control circuit 1253 to output data to the output port of the central processing unit (CPU) 100, an oscillation circuit 1254 to receive an oscillator output from the central processing unit (CPU) 100, a timing control circuit 1257 which receives the oscillation circuit 1254 output and generates timing signals, and a power saving control circuit 1258.

The communication node assumes the following conditions when it is initially powered on or reset. When each data transmitting node is powered on or reset, it assumes a duplex transmitting state which allows the transmission of a communication frame to or the reception of a communication frame from the transmission line after a lapse of a rise time. Subsequently, the data transmitting node in the duplex transmitting state transmits a plurality of transmission request data frames in sequence to other communication nodes. The transmission request data frame includes instructions to a data receiving node to transmit a specified communication frame to the data transmitting node. When the data receiving nodes return the requested communication frames in response to the transmission request data frames, the data transmitting node initializes its own operating conditions according to the requested communication frames and assumes its ordinary operating state.

Figure 5:
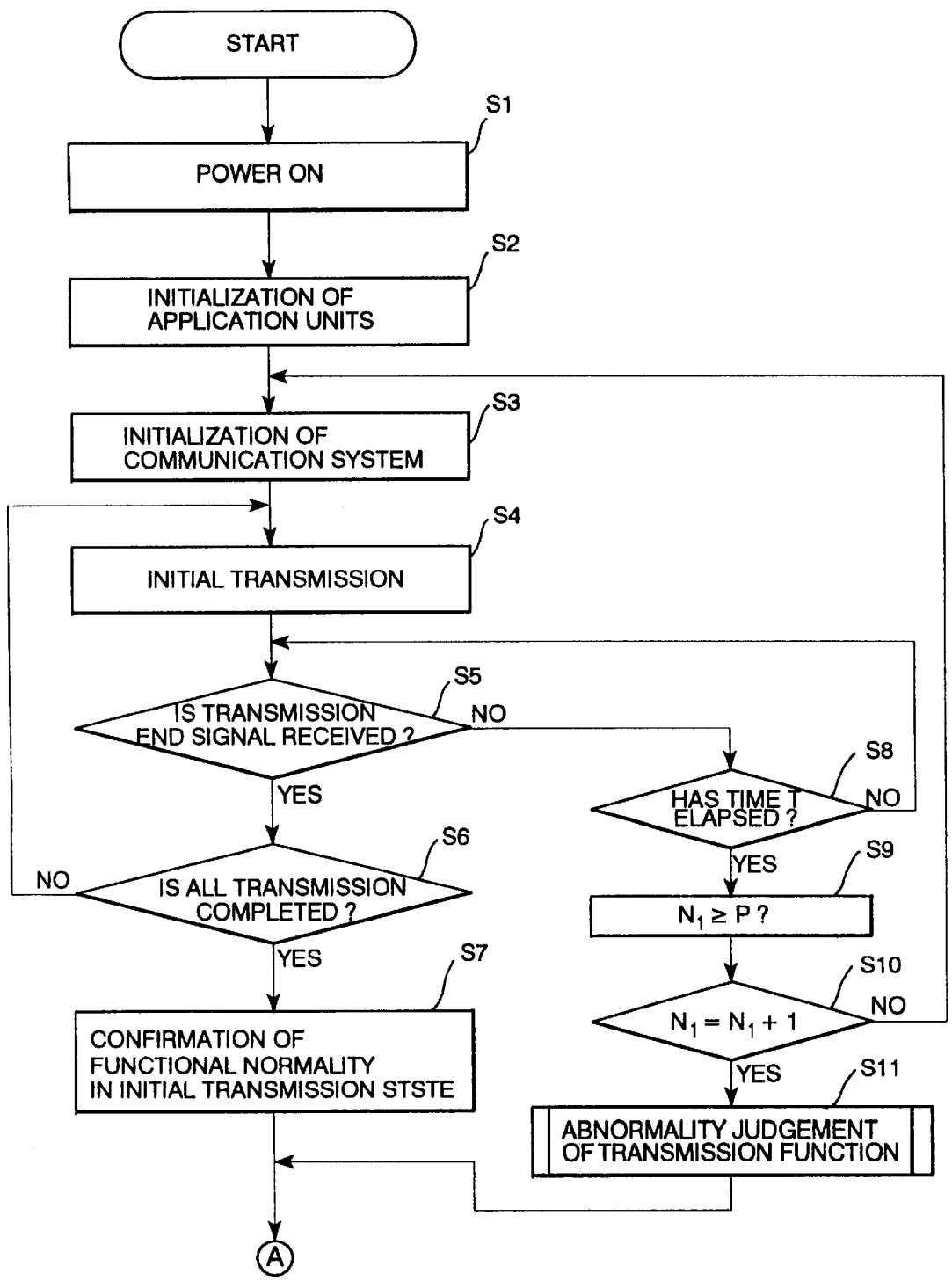
FIGS. 5 and 6 are a flow chart illustrating the functional normality judgement sequence routine.
Figure 6:
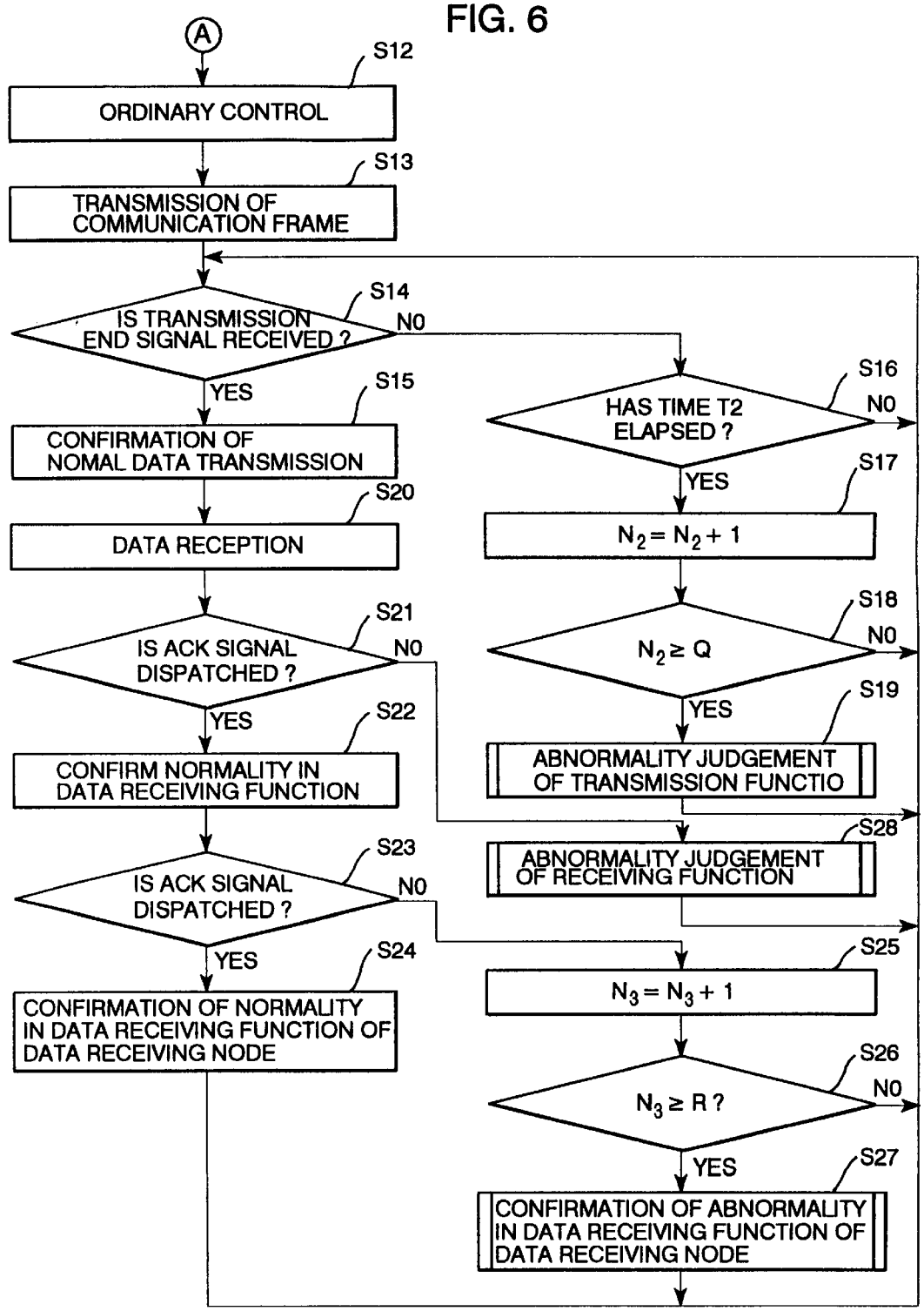

Referring to FIGS. 5 and 6 illustrating a flow chart showing the main sequence routine of functional abnormality judgement, during the initialization of each communication node, when a data transmitting node is powered on at step S1, following initializing the equipment or the control unit associated with the data transmitting node at step S2, the data transmitting node clears data stored in the last judgement from the memory for initialization at step S3, assuming the duplex transmitting state. At step S4, the data transmitting node starts initial transmission of the transmission request data frames in sequence to other data receiving nodes. During the initial transmission, a judgement is made at step S5 as to whether the central processing unit (CPU) 100 of the data transmitting node has received a transmission conclusion signal from the transmission control circuit 1250 every time one or a plurality of the transmission request data frames are transmitted. If the answer to the judgement is "YES," a further judgement is made at step S6 as to whether all of the transmission request data frames scheduled in the initial transmission have been transmitted. If the answer to the decision at step S6 is "YES," the judgement of functional normality is confirmed at step S7. If the answer to the judgement at step S6 is "NO," then, the data transmitting node effects the initial transmission of the transmission request data frames to the data receiving nodes in sequence once again at step S4.

On the other hand, if the answer to the judgement made at step S5 is "NO," this indicates that the central processing unit (CPU) 100 of the data transmitting node has not yet received any transmission conclusion signal from the transmission control circuit 1250. Then, a judgement is made at step S8 as to whether an interval of specified time T1 following the judgement made at step S5 has passed without receiving a transmission conclusion signal. If the answer to the judgement at step S5 is "YES," after changing the number of times $N_1$ of lapses of the intervals of specified time T1 by an increment of 1 at step S9, a further judgement is made at step S10 as to whether the number of times $N_1$ has reached a specified number P. If the answer to the judgement at step S10 is "YES," the judgement of functional abnormality is confirmed and the subroutine of abnormality judgement in a data transmitting/receiving state is conducted at step S11. The judgement at step S8 is repeated until the lapse of the interval of specified time T1 occurs as long as the central processing unit (CPU) 100 does not receive a transmission conclusion signal from the transmission control circuit 1250. If the number of times $N_1$ is less that the specified number P, i.e., the answer to the judgement made at step S10 is "NO," then, after clearing the stored data from the memory for initialization at step S3, the data transmitting node effects another initial transmission of the transmission request data frames to the data receiving nodes in sequence once again at step S4.

When the judgement of functional normality is confirmed at step S7 or after the completion of the subroutine of abnormality judgement in the data transmitting/receiving state at step S11, the main sequence routine performs an abnormality judgement in an ordinary transmitting state through steps S12–S28.

FIG. 6 illustrates a part of the functional normality judgement main routine which performs the abnormality judgement in the ordinary transmitting state. The first step in the abnormality judgement in FIG. 6 is to cause the data transmitting node to control its associated electronic equipment unit at step S12. After transmitting a communication frame to a data receiving node at step S13, the data transmitting node makes a judgement at step S14 whether its own central processing unit (CPU) 100 has received a transmission conclusion signal from the transmission control circuit 1250 every time it dispatches a frame transmission instruction signal to the communication circuit. When the central processing unit (CPU) 100 has received a transmission conclusion signal, the normality of data transmission function is confirmed at step S15. If the answer to the judgement at step S14 is "NO," then, a judgement is made at step S16 as to whether an interval time T2 following the judgement made at step S14 has passed without receiving a transmission conclusion signal. If the answer to the judgement at step S16 is "YES," after changing the number of times $N_2$ of lapses of the intervals of specified time T2 by an increment of 1 at step S17, a further judgement is made at step S18 as to whether the number of times N2 has reached a specified number Q. If the answer to the judgement in step S18 is "YES," then, the subroutine of abnormality judgement in the data transmitting/receiving state is conducted at step S19. The judgement at step S16 is repeated until the lapse of the interval of specified time T2 occurs as long as the central processing unit (CPU) 100 does not receive a transmission conclusion signal from the transmission control circuit 1250. Further, if the number of times $N_2$ is less than the specified number Q, i.e., the answer to the judgement made at step S18 is "NO," then, the data transmitting node effects another transmission of the transmission request data frames in sequence to other data receiving nodes once again at step S13.

When the judgement of the normality of data transmission function is confirmed at step S15, the main sequence routine performs an abnormality judgement in an ordinary data receiving state through steps S20, S21 and S28. Following commencement of receiving communication frames from the other data receiving nodes at step S20, a judgement is made in the central processing unit (CPU) 100 of the data transmitting node at step S21 as to whether the large-scale integrated (LSI) circuit dispatches an acknowledgement (ACK) signal in response to receiving the communication frame. If the answer to the normality judgement in step S21 is "YES," normality judgement in an ordinary data receiving state is confirmed at step S22. On the other hand, if the answer to the normality judgement in step S21 is "NO," then, the subroutine of abnormality judgement in the data transmitting/receiving state is conducted at step S28.

If the normality judgement in the ordinary data receiving state is confirmed at step S22, the main sequence routine performs an abnormality judgement in an ordinary data receiving state for the data receiving nodes through steps S23–S27. At step S23, a judgement is made in the central processing unit (CPU) 100 of the data transmitting node at step S14 as to whether there is an acknowledgement (ACK) signal from the data receiving node in response to the communication frame dispatched from the data transmitting node. If there is an acknowledgement (ACK) signal at the data transmitting node, the judgement of normality of data reception function is confirmed at step S24. On the other hand, if the answer to the judgement at step S23 is "NO," this indicates that the central processing unit (CPU) 100 confirms that there does not appear an acknowledgement (ACK) signal at the data transmitting node, then, after changing the number of times $N_3$ of no-return of acknowledgement signal by an increment of 1 at step S25, a further judgement is made at step S26 as to whether the number of times $N_3$ has reached a specified number R. If the answer to the judgement at step S26 is "YES," then, the subroutine of abnormality judgement in the data transmitting/receiving state is conducted at step S27. If the number of times $N_3$ is less that the specified number R, i.e., the answer to the judgement made at step S26 is "NO," then, the communication node effects another transmission of the communication frames once again at step S13.

Figure 7:
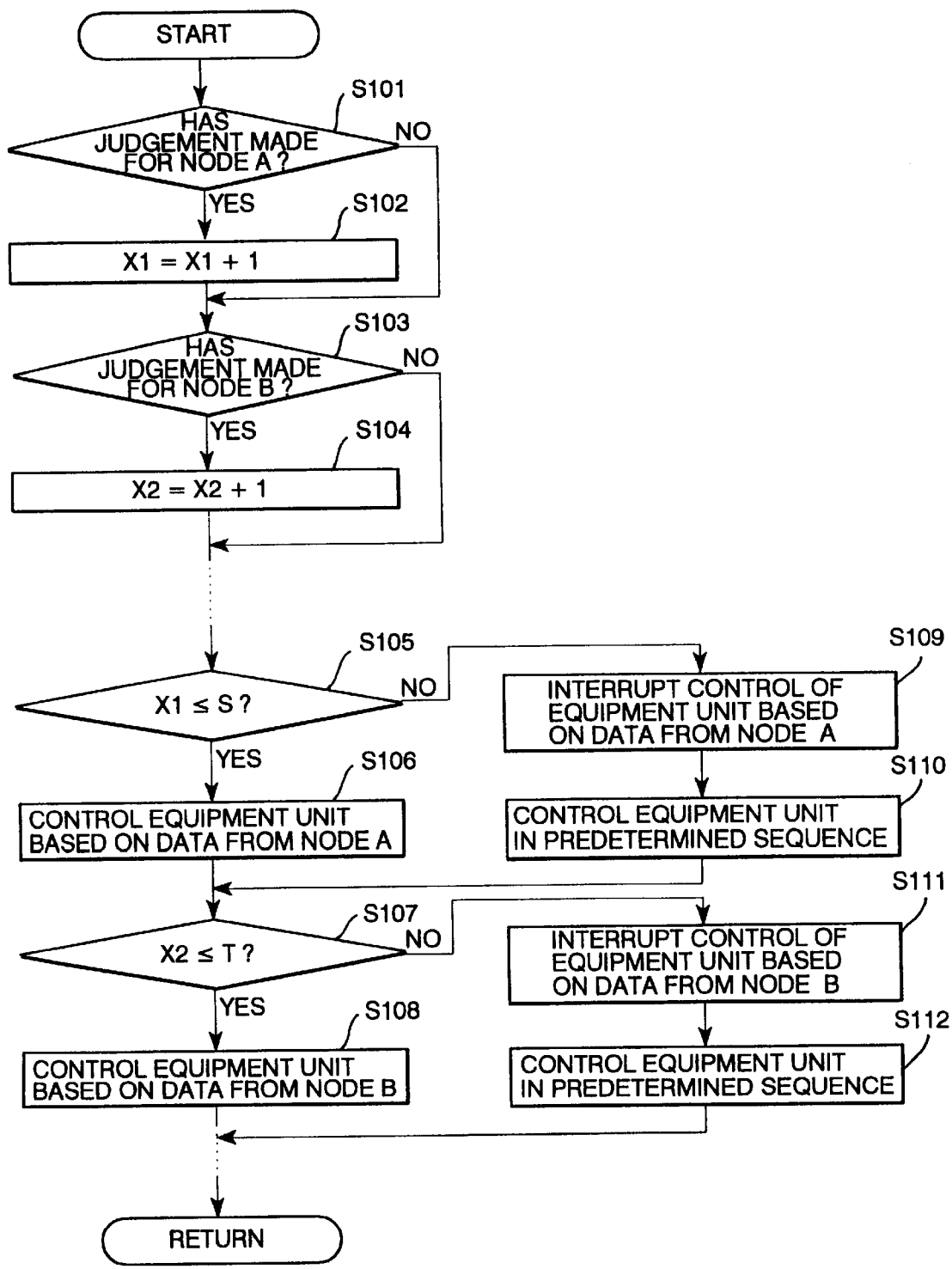
FIG. 7 is a flow chart illustrating the functional abnormality judgement sequence subroutine.

FIG. 7 is the sequence subroutine of abnormality judgement in the data transmitting/receiving state conducted when functional abnormality is judged at step S11, S19, S27, or S28 in the main sequence routine.

The first step at step S101 in the sequence subroutine shown in FIG. 7 is to judge whether the data transmitting node has made an abnormality judgement for one node A of the data receiving nodes. After changing the number of times X1 of the abnormality judgement for the one data receiving node A by an increment of 1 at step S102, another judgement is made at step S103 as to whether the data transmitting node has made an abnormality judgement for another node B of the data receiving nodes. Similarly, the number of times X2 of the abnormality judgement for the other data receiving node B is changed by an increment of 1 at step S104. The abnormality judgement is sequentially made for the remaining data receiving nodes in the same network. Subsequently, a judgement is made at step S105 as to whether the number of times X1 of abnormality judgement concerning the data receiving node A is less than or equal to a specified number of times S. If the answer to the decision in step S105 is "YES," the data transmitting node controls its associated equipment or control unit based on data transmitted from the data receiving node A at step S106. On the other hand, if the answer to the decision in step S105 is "NO," i.e., the number of times X1 of abnormality judgement has reached the specified number of times S, this indicates that there might be potential destruction of the transmitted data from the data receiving node A, then, the data transmitting node interrupts control of its associated equipment on the basis of the transmitted data from the data receiving node A at step S109 and, however, performs predetermined pertinent control of the associated equipment at step S110. For example, if the data transmitting node is assigned to bear control of a head light power output equipment on the basis of data from the data receiving node A, it holds the head light power output equipment always ready to light-up the head light in the predetermined pertinent control, so that the vehicle does not encounter risks of the failure of power supply to the head light due to abnormality of the data receiving node A during traveling. The predetermined pertinent control is peculiar and pertinent to an equipment associated with the data transmitting node.

Subsequently to either the control of the associated equipment or control unit based on data transmitted from the data receiving node A at step S106 or the predetermined pertinent control of the associated equipment or control unit at step S110, a judgement is made at step S107 as to whether the number of times X2 of abnormality judgement concerning the data receiving node B is less than or equal to a specified number of times T. If the answer to the decision in step S107 is "YES," the data transmitting node controls its associated equipment or control unit based on data transmitted from the data receiving node B at step S108. On the other hand, if the answer to the decision is "NO," i.e., the number of times X2 of abnormality judgement has reached the specified number of times T, this indicates that there might be potential destruction of the transmitted data from the data receiving node B, then, the data transmitting node interrupts control of its associated equipment on the basis of the transmitted data from the data receiving node B at step S111 and performs the predetermined pertinent control of the associated equipment at step S112. The same control procedure is taken according to the result of a judgement of the number of times Xn of abnormality judgement with respect to a specified number of times for each of the remaining data receiving nodes in order.

As described above, the data transmitting node observes normality in data reception function of each of the data receiving nodes as well as normality in its own data reception function and interrupts control of its associated electronic equipment or control unit on the basis of data from any one of the data receiving nodes if the data receiving node is judged to be abnormal in its data reception function. This yields an improvement of the functional reliability of the whole system.

Figure 8:
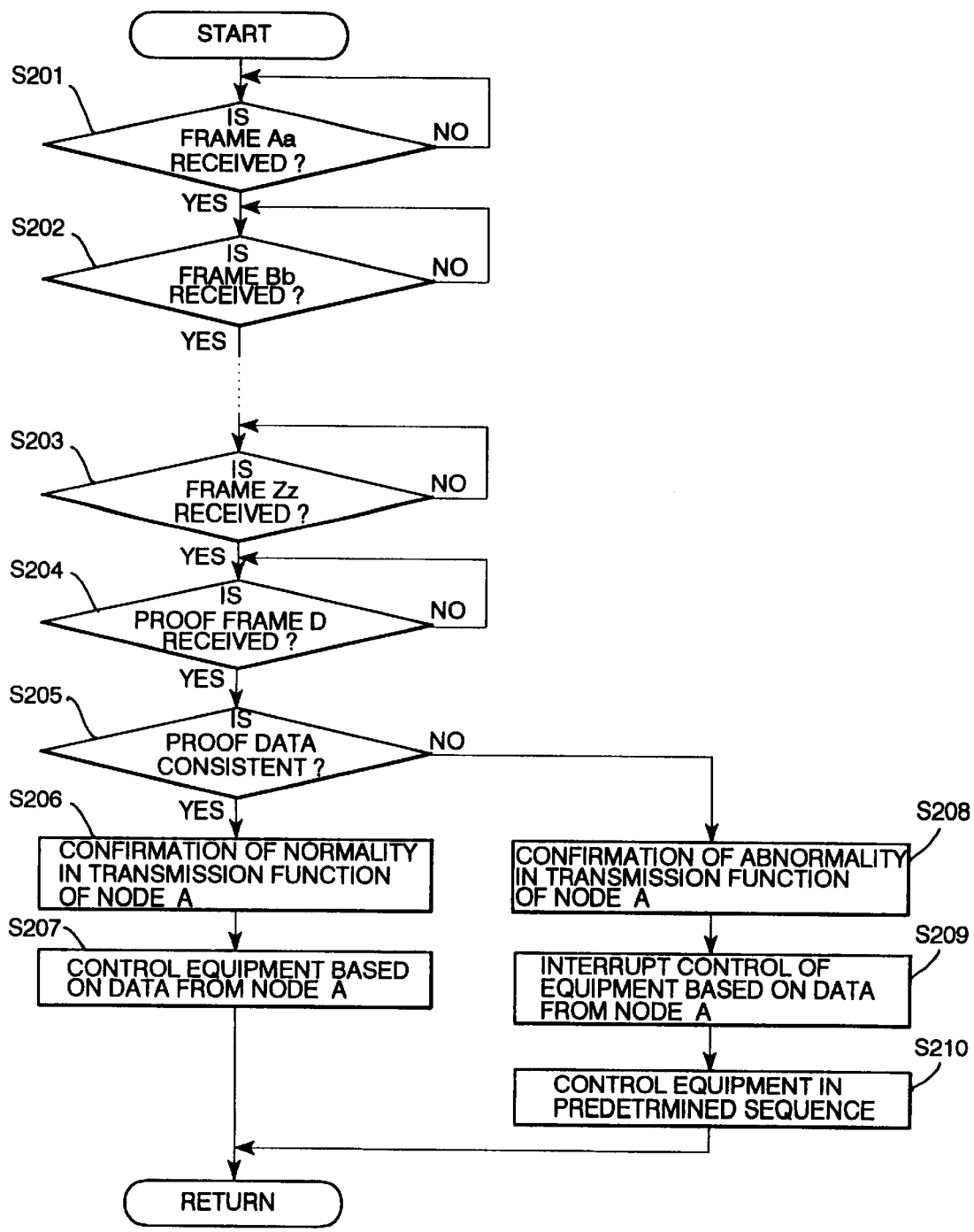
FIG. 8 is a flow chart illustrating the sequence subroutine of judgement of abnormality in data transmission function made at a data receiving node.

Referring to FIG. 8, which is a flow chart illustrating a sequence routine of a judgement of normality in a data transmission function of a communication node made by a data receiving node, it will be recalled from the above description of FIGS. 5 and 6 that, subsequent to a data transmitting node starting initial transmission of the transmission request data frames each of which includes instructions to another data receiving node to transmit a specified communication frame to the data transmitting node after having powered on or reset the multiplex data communication system, the data transmitting node transmits a proof data frame with which the data receiving node proves whether the data transmitted is true. Specifically, the data receiving node judges whether specified data contained in the proof data frame from the data transmitting node is consistent with its pre-agreed data. If there is a consistency between these proof data, the data receiving node proves the truth of transmitted data.

When the sequence routine commences and a data receiving node receives communication frames Aa–Az from one of other communication nodes, which is specified as a data transmitting node A, in initial transmission mode. Data reception is proved for the communication frames Aa–Az at steps S201 through S203, respectively. If the reception of all of the communication frames Aa–Az is proved, a judgement is made at step S204 as to whether a proof data frame D containing specific proof data has been received. Subsequently, a judgement is made at step S205 as to whether which the data receiving node has the proof data consistent with the proof data contained in the data frame D which it has received. If there is the data consistency, this proves the normality in data transmission function of the data transmitting node A and the truth of data contained in the initially transmitted data frame at step 206, then, the data receiving node performs control of its associated electronic equipment or control unit based on data contained in the initially transmitted communication frame at step S207. On the other hand, if there is no data consistency, this indicates that abnormality exists in data transmission function of the data transmitting node A, then, it is determined at step S208 that there might be potential destruction of the data transmitted from the data transmitting node A. Subsequently, after interrupting control of the associated electronic equipment or control unit on the basis of the transmitted data from the data transmitting node A at step S209, the data receiving node performs the predetermined pertinent control of the associated equipment at step S210.

As shown in FIG. 9, the proof data frame D includes data fields, such as an identification data field written in which is information indicating that the data frame contains proof data, a data-1 field written in which is address information of the data transmitting node, a data-2 field written in which is reversed address information, a data-3 field written in which is information agreed between the data transmitting node and a specified data receiving node, and a data-4 field written in which is reversed information of the information in the data-3 field.

The utilization of all of the information written in the data fields provides reliable observation of normality in communication function of the communication node. For example, even if a communication node receives a proof data frame containing wrong address information in the data-1 field, as long as the information in the data-3 field is correct, the data receiving node does not in any way judge the proof data frame to be acceptable. In such a manner, since the proof data frame includes a compound data of address information and agreed information and their reversed information, the communication node does make a functional normality judgement with an improved precision. Furthermore, because the proof data frame includes the information indicating the species of frame at the beginning, even if a receiving node receives a proof data frame interrupting an incoming proof data frame, it easily reads which communication node transmits the proof data frame. This proof data frame may be employed during ordinary operation of the system.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A multiplex data communication system including a plurality of communication nodes interconnected by means of a transmission path, said communication nodes controlling electronic equipment units connected thereto, respectively, each one of said communication nodes comprising:

a data transmitting/receiving circuit to receive data transmitted from at least another one of said communication nodes through said transmission path and to transmit data relating to said each communication node through said transmission path, said data transmitting/receiving circuit providing a reception signal representative of normal reception of said data from said at least another communication node and a transmission signal representative of normal transmission of said data relating to said each communication node; and a data operating circuit to control an electronic equipment unit associated with said each communication node based on said data received from said at least another communication node and to generate said data relating to said each communication node which is transmitted by said data transmitting/receiving circuit, said data operation circuit making a decision of normality of a data communication function of said each communication node based on at least one of said reception signal and said transmission signal.

2. A multiplex data communication system as defined in claim 1, wherein said data operating circuit decides normality in communication function of another communication node when said data transmitting/receiving circuit receives a reception signal provided by said at least another communication node.

3. A multiplex data communication system as defined in claim 1, wherein said data operating circuit initializes said data transmitting/receiving circuit and causes said data transmitting/receiving circuit to effect transmission of said data relating to said each communication node again when determining said each communication node to be abnormal in communication function.

4. A multiplex data communication system as defined in claim 1, wherein said data operating circuit transmits specified data with which another communication node decides normality in communication function of said each communication node when causing said data transmitting/receiving circuit to transmit said data relating to said each communication node.

5. A multiplex data communication system as defined in claim 1, wherein said data operating circuit decides said each communication node to be abnormal in communication function when said data transmitting/receiving circuit does not provide said transmission signal within a specified period of time.

6. A multiplex data communication system as defined in claim 1, wherein said data operating circuit interrupts transmission of data from and reception of data to said data transmitting/receiving circuit when a decision of abnormality in communication function of said each communication node is continually repeated a specified number of times.

7. A multiplex data communication system as defined in claim 2, wherein said data operating circuit interrupts control of said electronic equipment unit associated with said each communication node based on data from another communication node when a decision of abnormality in communication function of said at least another communication node is continually repeated a specified number of times.

8. A multiplex data communication system as defined in claim 7, wherein said data operating circuit interrupts transmission of said data relating to said each communication node to another communication node when a decision of abnormality in communication function of said at least another communication node is continually repeated a specified number of times.

9. A multiplex data communication system as defined in claim 1, wherein said data operating circuit transmits a proof data frame with which another communication node proves normality in data transmission function of said each communication node before transmitting a communication data frame.

10. A multiplex data communication system as defined in claim 9, wherein said each communication node includes means for proving data in a specified area of said proof data frame from another communication node to be acceptable so as to observe normality in transmission function of said at least another communication node.

11. A multiplex data communication system including a plurality of communication nodes interconnected by means of a transmission path so as to intercommunicate with one another through the transmission path, each said communication node comprising:

data transmitting means for transmitting a proof data frame with which another communication node proves normality in data transmission function of said each communication node before transmission of a communication data frame of data attributive to each said communication node; and data receiving means for receiving said proof data frame and said communication data frame from another communication node, said data receiving means proving specific data contained in said proof data frame so as to observe normality in transmission function of said another communication node and assuming abnormality of said another communication node when said data in said specified area of said proof data frame is unacceptable.

12. A multiplex data communication system as defined in claim 11, wherein said data transmitting means transmits said proof data frame before said multiplex data communication system is brought into operation.

13. A multiplex data communication system as defined in claim 12, wherein said data transmitting means transmits said proof data frame every time said multiplex data communication system is powered on.

14. A multiplex data communication system as defined in claim 12, wherein said data transmitting means transmits said proof data frame every time said multiplex data communication system is reset.

15. A multiplex data communication system as defined in claim 11, wherein said proof data frame contains compound data including specific data predetermined between each said communication node and said another communication node and modified data of said specific data.

16. A multiplex data communication system as defined in claim 15, wherein said modified data is reversed data of said specific data.

* * * * *